United States Patent [19]
Kumagai et al.

[11] Patent Number: 5,032,356
[45] Date of Patent: Jul. 16, 1991

[54] HIGH FATIGUE STRENGTH METAL BAND SAW BACKING MATERIAL

[75] Inventors: Atushi Kumagai, Yonago; Toshio Okuno; Yoshihiro Minagi, both of Yasugi; Katuaki Fukushima, Shimane, all of Japan

[73] Assignee: Hitachi Metals, Ltd., Tokyo, Japan

[21] Appl. No.: 510,122

[22] Filed: Apr. 17, 1990

[51] Int. Cl.$^5$ .............................................. C22C 38/24
[52] U.S. Cl. ...................................... 420/111; 420/67; 420/105; 420/108; 420/109; 420/112; 420/114
[58] Field of Search .............. 420/105, 108, 109, 111, 420/112, 114, 67

[56] References Cited

U.S. PATENT DOCUMENTS

| | | | |
|---|---|---|---|
| 3,640,114 | 2/1972 | Foley, Jr. | 420/105 |
| 4,353,743 | 10/1982 | Vander Voort | 420/105 |
| 4,358,317 | 11/1982 | Abe | 420/111 |
| 4,855,106 | 8/1989 | Katsumata et al. | 420/111 |

FOREIGN PATENT DOCUMENTS

| | | |  |
|---|---|---|---|
| 52-08918 | 1/1977 | Japan . | |
| 5532778 | 1/1977 | Japan . | |
| 161050 | 10/1982 | Japan | 420/111 |
| 0113355 | 7/1983 | Japan | 420/111 |
| 61-12022 | 4/1986 | Japan . | |

*Primary Examiner*—Upendra Roy
*Attorney, Agent, or Firm*—Antonelli, Terry, Stout & Kraus

[57] ABSTRACT

A high fatigue strength metal band saw backing material of the present invention comprises 0.27 to 0.40% of C, not more than 0.35% of Si, 0.3 to 1.2% of Mn, 0.45 to 0.75% of Ni, more than 3.0% to 4.5% of Cr, 1.5 to 2.3% of one or two of Mo and W in terms of "Mo+W/2", 0.03 to 0.2% of one or two of V and Nb in terms of "V+Nb/2", in terms of percent by weight, the balance Fe and inevitable impurities. The metal band saw can maintain its high fatigue strength even if it is subjected to heat treatment under the same conditions as those for high speed steel used as an edge material and thus exhibits excellent properties as a metal band saw backing material.

6 Claims, 1 Drawing Sheet

PARALLEL PORTION

HIGH FATIGUE STRENGTH METAL BAND SAW BACKING MATERIAL

BACKGROUND OF THE INVENTION

The present invention relates to a metal band saw backing material which is welded to the high speed steel used as an edge material.

Metal band saws are generally formed by welding high speed steel used as an edge material to inexpensive low alloy steel used as a backing material for the purpose of saving expensive high speed steel. After an edge material has been welded to a backing material, both materials are subjected to heat treatment which is suited to the high speed steel used as the edge material, i.e., quenching at about 1200° C. to 1220° C. and tempering at 540° C. to 580° C.

Although JIS G4051 S50C. (carbon steel) and AISI6150 are generally used as backing materials, these backing materials have the problem that, if they are subjected to heat treatment under conditions for quenching and tempering which are the same as those for high speed steel, the toughness of the backing materials is deteriorated owing to the excessively high quenching temperature, and the hardness is also deteriorated owing to the excessively high tempering temperature. Such heat treatment therefore provides backing materials with insufficient tensile strength and causes the deterioration in the fatigue strength of backing materials, this resulting in the occurrence of fracture therein.

In order to solve these problems, the applicants of the present invention investigated materials which allow sufficient hardness to be secured even under conditions for heat treatment which are the same as those for high speed steel. As a result, the applicant could develop new alloys and bring them into practical use, as disclosed in Japanese Patent Publication Nos. 54-5366, 55-32778 and 61-12022.

A description will now be give of the latest trend of metal band saws which is a clue to the present invention.

A metal band saw is endless-welded and driven by the two wheels, which are installed in a band sawing machine so as to cut a material to be cut which is mainly a steel material and is firmly and horizontal held between the wheels. The metal band saw is loaded with tension between the wheels so that no cutting curvature occurs in the steel material and is repeatedly subjected to bending stress along the wheels when being driven.

The wheels have an inclination relative to the horizontal direction so that the metal band saw is loaded with torsion corresponding to the inclination of the wheels. The metal band saw is therefore subjected to the loads of tensile stress and bending and torsion stress during when being driven.

In the above-described metal band saw, the following problems have recently arisen:

A first problem is that, since cutting conditions are gradually made severe with an increase in the number of kinds of hard-to-cut materials such as super heat resistant steel and stainless steel and an improvement in cutting efficiency, backing materials are also required to have high performance and a long life.

A second problem is that, since high tension is required for improving cutting precision and backing materials are used in a cutting apparatus under a high stress load which has never been applied, conventional body materials have short life of up to fracture, and there is a demand for a backing material having higher fatigue strength.

SUMMARY OF THE INVENTION

It is an object of the invention to provide a metal band saw backing material which allows sufficient hardness and a long fatigue life to be secured even if it is subjected to the same heat treatment as that for high speed steel used as an edge material and which has high fatigue strength, high performance and a long life so as to comply with the above-described requirements.

The inventor made experiments for the purpose of clarifying the problems of the alloys disclosed in Japanese Patent Publication Nos. 54-5366, 55-32778 and 61-12022 with an aim to significantly improve the fatigue strength thereof.

As a result, it was found that, although the alloys each of which contains 3% or less of chromium (Cr) and which are respectively disclosed in Japanese Patent Examined Publication Nos. 54-5366 and 61-12022 are inexpensive, if the Cr content is low, an increase in diffusion of carbon (C) from each of the alloys used as a backing material to the high speed steel used as an edge material sometimes causes damage to the carburized portion of the high speed steel during welding. It was also found that the Cr content of 3% or less is insufficient to contribute to an improvement in toughness, which is caused by the aggregation of Cr carbide, and that the alloys are not necessarily sufficient as backing materials for metal band saws which has been recently used under severe conditions.

In Japanese Patent Examined Publication No. 55-32778, 0.05 to 0.1% of aluminum (Al) is added for the purpose of preventing the generation of blow holes in a welding portion when a backing material is welded to an edge material. However, it was found that, in order to reduce the amount of non-metallic inclusions, which has a significantly effect on fatigue strength, it is preferable to produce steel by using a refining method which is capable of sufficiently removing gas such as oxygen and nitrogen gas from the backing material without positively adding Al and achieve sound welding.

It was confirmed by a relation to Japanese Patent Examined Publication No. 55-32778 that it is necessary for an improvement in fatigue strength to satisfactorily limit main elements within appropriate ranges. In particular, since vanadium (V) and niobium (Nb) have a tendency to form hard carbides which have a significant effect on fatigue strength, it was confirmed that the upper limit of the amount of (V+Nb/2) is 0.2% in the steel used in the present invention. It was also found that it is necessary to limit contents of C (carbon), Si (silicon), Cr, Mo (molybdenum) and Ni (nickel) within relatively narrow ranges.

It is a primary object of the present invention to improve the fatigue strength of a backing material. In order to achieve this object, in the present invention, the amounts of the above-described main elements are controlled, as well as the amounts of non-metallic inclusions and P (phosphorus), S (sulfur), N (nitrogen) and O (oxygen), which can create the occurrence of defect in blow holes and segregation during welding, being reduced as much as possible, and the amount of non-metallic inclusions is further reduced to a specified value or less so that the fatigue strength can be further improved.

The present invention provides a high fatigue strength metal band saw backing material containing 0.27 to 0.40% of C, 0.35 or less of Si, 0.3 to 1.2% of Mn (manganese), 0.45 to 0.75% of Ni, more than 3.0 to 4.5% of Cr, more than 1.5 to 2.3% of one or two of Mo and W (tungsten) in terms of "Mo+W/2", 0.03 to 0.2% of one or two of V and Nb in terms of "V+Nb/2", in terms of percent by weight, the balance Fe and inevitable impurities, as well as a high fatigue strength metal band saw backing material containing the above-described elements and 0.2 to 3% by weight of Co. The present invention also provides a high fatigue strength metal band saw backing material in which, of the above-described main elements, Si is regulated to 0.08% by weight or less, and further more P (phosphorus), S (sulfur), N (nitrogen) and 0 (oxygen) as regulated to 0.12% by weight or less, 0.004% by weight or less, less than 0.2% by weight and less than 30 ppm, respectively. The present invention further provides a high fatigue strength metal band saw backing material in which the amounts of P, S, N, 0 are respectively regulated to the above-described values, and the amount of non-metallic inclusions measured by the JIS method is 0.004 or less in terms of dA120×400 and 0.008 or less in terms of d(B+C) 60×400.

A high fatigue strength metal band saw backing material having each of the aforementioned compositions can be produced from the ingot formed by refining using one or more refining processes selected from the group consisting of a vacuum melting process, a vacuum degassing process and an electroslag remelting process.

DETAILED DESCRIPTION OF THE INVENTION

Figure 1:
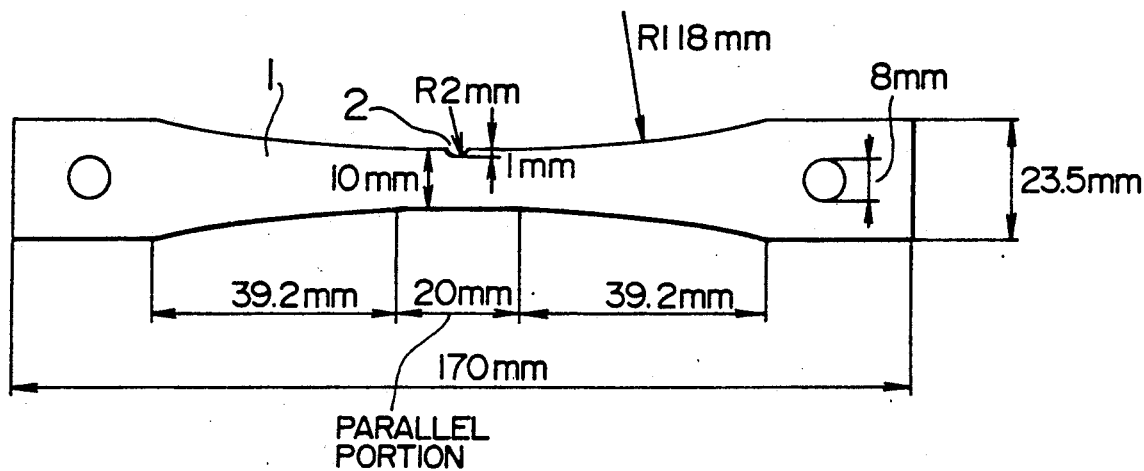
FIG. 1 is a drawing of the test piece used in a tensile fatigue test for a steel specimen.

Although the compositions of the backing materials of the present invention are described above, the chemical composition and the reason for providing limits to the amounts of non-metallic inclusions are described below. The ranges of the amounts of the main elements in the chemical composition were determined under the conditions for heat treatment which were the same as those for high speed steel and conditions that at least HV450 of Vickers hardness is secured, and a microstructure, which shows high fatigue strength, is obtained.

C. (carbon) is an essential element for a backing material to secure the strength and toughness and is combined to carbide-forming elements such as Cr, Mo, W, V and Nb and precipitated as fine carbides in tempering at 540° C. to 580° C. so as to increase the resistance to softening in tempering. In order to obtain HV450 or more in tempering, the C. content must be at least 0.27%. the precipitation of carbides, which is caused by tempering, has a significant effect on the toughness of steel. Although the chromium carbide relatively easily aggregates after precipitation, the molybdenum and tungsten carbides, M2C. type, are finely precipitated and contribute to an increase in the resistance to softening. The molybdenum (Mo) and tungsten (W) carbides, however, cause the deterioration in toughness, and it is thus undesirable to add excessive amounts of Mo and W. The upper limit of carbon (C) is therefore 0.40% in consideration of the kinds ad the amounts of molybdenum, tungsten, chromium carbides and the like.

Cr must be added in an amount over 3% by weight for the purpose of increasing the hardenability of the backing material and preventing the diffusion of C (carbon) from the backing material to high speed steel during the welding of the backing material to the high speed steel, as described above. Cr is also combined to carbon to form a chromium carbide which is precipitated during tempering. Although the chromium carbide contributes a little to the resistance to softening, it easily aggregates and has an effect of improving toughness. If an excessive amount of Cr is added, the chromium carbide is mainly produced in the presence of $M_2C$. type carbide and causes the deterioration in the resistance to softening. It is therefore necessary to provide upper and lower limits. As a result of the investigation, the Cr content is within the range of more than 3.0% to 4.5%.

Ni is an element which dissolves in matrix so as to increase hardenability and contribute to an improvement in toughness. In a backing material having high toughness, even if a fatigue crack occurs, the backing material is not brittlely fractured because the crack slowly proceeds. Although at least 0.45% of Ni is necessary for obtaining this effect, if the amount of Ni exceeds 0.75%, the effect of improving toughness is not obtained, but an effect of insufficient strength caused by insufficient heat treatment hardness is produced. The upper limit of Ni is therefore 0.75%.

Mo and W are elements effective for toughness and wear resistance, respectively, and are strong secondary hardening elements. It is therefore necessary to add one or two of Mo and W to a backing material which is subjected to heat treatment under the same conditions as those for high speed steel and which is required to maintain hardness. As described above, however, since molybdenum and tungsten carbides finely precipitate and easily aggregate, the presence of large quantities of Mo and W causes a reduction in toughness. Investigation was thus made on the amounts of Mo and W from the viewpoints of an improvement in toughness, which is caused by aggregation of the chromium carbide, and the guarantee of softening resistance and the deterioration of toughness, which are caused by the excessive $M_2C$. type carbides. As a result, it was found that an appropriate molybdenum equivalent in terms of "Mo+W/2" is within the range of more than 1.5% to 2.3%. In addition, composite addition of Mo or W and V or Nb enables an increase in the resistance to aggregation of fine carbides and an increase in the resistance to softening.

Vanadium (V) and niobium (Nb) are precipitated as primary carbides during solidification and are elements effective to reduce the crystal grain size. When low-alloy steel such as the backing material of the present invention is subjected to the same heat treatment as that for the high speed steel used as an edge material, there is a danger of deteriorating the mechanical strength owing to remarkable coarsening of the crystal grains. The vanadium and niobium carbides not only partially dissolve in matrix during tempering so as to contribute to secondary hardening but also remains as carbides, which do not dissolve in matrix, so as to prevent coarsening of the crystal grains during the same heat treatment as that for the high speed steel at the same time as it. It is therefor necessary that a vanadium equivalent in terms of "V+Nb/2" is at least 0.03%.

On the other hand, although the carbides of the elements are hard and thus contribute to wear resistance, there is the high probability that the carbides are the trigger point of the occurrence of cracks concerned with mechanical strength, particularly fatigue strength. In the composition system of the present invention, if a vanadium equivalent exceeds 0.2%, VC (vanadium carbide) and/or NbC (niobium carbide) excessively remain in the structure after the heat treatment, and there is a tendency to increase the distribution density of fine precipitated carbides and decrease the fatigue strength. The upper limit of V (vanadium) is therefore 0.2%.

0.3% or more of Mn is generally contained as a deoxidizer in steel. Since workability is also an important factor during the production of a thin plate material such as a backing material, and an excessive content of Mn causes the deterioration in workability, particularly, during cold working, the upper limit of Mn is 1.2%.

Silicon (Si) is added as a deoxidizer in the same manner as Mn. However, if the amount of Si exceeds 0.35%, Si easily remains as hard non-metallic inclusions such as $SiO_2$ and adversely affects the fatigue strength. The upper limit of Si is therefore 0.35%. When deoxidation was effected by another method such as a vacuum melting process or a vacuum degassing process, and when Si was considered as a constituent element, there was a tendency to improve the toughness value, particularly the Charpy impact value, even if the Si content is further decreased. In regard to the fatigue strength, since an effect of increasing the life was obtained by reducing the Si content to 0.08% or less, it is effective to regulate the Si content to 0.08% or less when a more severe fatigue load is applied.

Cobalt (Co) is an element which dissolves in matrix and is effective to heat resistance and resistance to seizure. Since a backing material constantly contacts with a material to be worked on and slides thereon, the backing material is required to have not only wear resistance but also heat resistance and resistance to seizure. This requirement becomes more important as the cutting speed is increased. In order to increase an effect or improving wear resistance and heat resistance, the Co content must be therefore 0.2% or more. However, if the Co content exceeds 3%, required hardness after heat treatment cannot be achieved. The upper limit of Co is thus 3%.

Phosphorus (P), sulfur (S), nitrogen (N) and oxygen (O) are contained as impurities in steel. Phosphorus dissolves in matrix and causes the deterioration in toughness, as well as segregating at grain boundaries and causing a decrease in bonding strength of each grain. Sulfur and oxygen are mainly present as non-metallic inclusions. Sulfur produces inclusions having relatively good ductility and thus causes anisotropy in a material Oxygen forms hard oxide inclusions and causes the decrease in fatigue strength. In a material such as backing material for a metal band saw which is required to have high fatigue strength, a sufficient effect cannot be obtained by regulating only one element of these inclusions. In the present invention, therefore, since an effect of improving fatigue strength was obtained by regulating the four elements phosphorus (P), sulfur (S), nitrogen (N) and oxygen (O) to 0.012% or less, 0.004% or less, less than 0.02% and less than 30 ppm, respectively, the above-described values are considered as upper limits.

A description will now be given of the reason for providing a limit to non-metallic inclusions.

The non-metallic inclusions are measured on the basis of JIS G0555 "Microscopic Testing Methods for the Non-metallic Inclusions in Steel" and expressed by cleanness in the forms of A-type and (B+C) type inclusions. According to the JIS method, inclusions in a steel are classified into following 3 types.

A type inclusion: inclusion formed by viscous deformation during working and typical A type inclusions are sulfides and silicates.

B type inclusion: inclusions formed by granular inclusions discontinuously and collectively disposed in the working directions, a typical B type inclusion is alumina.

C type inclusions: inclusions formed by irregular dispersion without viscous deformation and a typical C type inclusion is granular oxide.

In the JIS method, 60 visual fields are measured as a rule with a magnification of microscope x 400, and the index of cleanliness of the steel (d %) is calculated by the following formula, $$d \% = \frac{n}{p \times f} \times 100$$

where,
p: Total number of grating points on the glass plate in the visual field
f: Number of the visual fields
n: Number of grating points occupied by the inclusions through the visual fields numbering f.

In order to achieve high fatigue strength, however, it is preferable that the metal band saw backing material of the present invention shows as low index valued as 0.004 which is a value obtained by measuring 120 visual fields, i.e., dA120 x 400, particularly for A-type inclusions. In the case of a index value over this value, the probability that the elongated sulfide inclusions serve as the starting point of fatigue fracture is increased.

The amount of (B +C)-type inclusions preferably shows a index value of 0.008 in terms of d(B C) 60×400. This is because, if the value exceeds 0.008, the (B +C)-type inclusions are sometimes present in an aggregation state and can become the starting point of fatigue fracture.

In order to produce the steel of the present invention, it is preferable to use one or more refining methods selected from a vacuum melting process, a vacuum degassing process and an electroslag remelting process for the purpose of improving the fatigue strength by decreasing the amounts of impurities such as phosphorus (P), sulfur (S), nitrogen (N), Oxygen (O) and the like and regulating the amount of non-metallic inclusions to the above-described value or less.

EXAMPLE

The present invention is described below with reference to examples. Table 1 shows the chemical compositions of the metal band saw backing materials produced in accordance with the present invention (referred to as "steel of the present invention" hereinafter) together with conventional steel and comparative steel in order to evaluate the steel of the present invention. Steel specimen Nos. 1, 2, 3, 4 and 5 were conventional steel. Of these specimens, Specimen No. 3 was steel corresponding to Japanese Patent Examined Publication No. 54-5366, Specimen No. 4 was steel corresponding to Japanese Patent Publication No. 61-12022 and Specimen Nos. 1 and 5 were steel corresponding to Japanese Patent Examined Publication No. 55-32778, all of which had compositions out of the ranges of the present invention. Of the steel specimens of the present invention, Specimen Nos. 8 and 9 were subjected to vacuum induction melting, Specimen No. 10 was subjected to vacuum degassing treatment, Specimen Nos. 11 and 12 were subjected to electroslag remelting, and Specimen Nos. 13 and 14 were subjected to electroslag remelting after vacuum degassing treatment.

In regard to the impurities and the non-metallic inclusions, Specimen No. 3, which was conventional steel, contained phosphorus (P), sulfur (S) and A-type inclusions in levels which could be reduced to substantially the same levels as those of the steel of the present invention by selecting a high purity raw material containing small quantities of P and S. Specimen No. 15, which was the steel of the present invention, was refined by a conventional electric arc furnace in atmosphere and contained main elements within the ranges of the present invention.

performed under the same conditions as those of usual heat treatment for high speed steel JIS G4403 SKH59, which is a typical edge material, i.e., at a quenching temperature of 1200° C. and a tempering temperature of 560° C. The tensile fatigue test was carried out by using a tensile test piece 1 with a notch 2 having a depth of 1 mm and a radius of 2 mm, as shown in FIG. 1. The notch 2 was finished by precision finishing (or a good finish and accurate dimensions). Stress was loaded on the notch with a minimum tensile stress of 30 kgf/mm$^2$ and a maximum tensile stress of 100 kgf/mm$^2$ under the condition of a stress cycle of 10 Hz.

Table 2 shows the results of the tests. Since Specimen No. 1, which is conventional steel, is high-Cr steel, it exhibits dominant precipitation and aggregation of Cr carbides and low resistance to softening and cannot easily gain high hardness despite of containing Mo and W. In addition, although Specimen Nos 2 to 7 has hardness to some extent, the hardness is at most the lower limit of the steel of the present invention or lower than the limit.

TABLE 1

| Group | Steel Specimen No. | Chemical Composition (wt %) [Oxygen (ppm)] | | | | | | | | | | | | | |
|---|---|---|---|---|---|---|---|---|---|---|---|---|---|---|---|
| | | C | Si | Mn | P | S | Ni | Cr | Mo | W | V | Nb | Co | N | O | Al |
| Conven- | 1 | 0.26 | 0.52 | 1.15 | 0.010 | 0.008 | — | 5.95 | 1.45 | 1.44 | 0.07 | 0.02 | — | 0.026 | 28 | 0.05 |
| tional | 2 | 0.43 | 0.25 | 0.35 | 0.015 | 0.012 | — | 1.97 | 0.51 | — | 0.54 | 0.12 | — | 0.030 | 30 | — |
| Steel | 3 | 0.46 | 0.32 | 0.37 | 0.010 | 0.004 | — | 2.10 | 0.81 | — | 0.62 | — | — | 0.031 | 32 | — |
| | 4 | 0.42 | 0.35 | 0.67 | 0.011 | 0.009 | 0.71 | 2.35 | 1.70 | — | 0.35 | — | — | 0.024 | 34 | — |
| | 5 | 0.28 | 0.32 | 0.73 | 0.012 | 0.008 | 0.62 | 4.20 | 2.01 | — | 0.26 | — | — | 0.025 | 32 | 0.07 |
| Compara- | 6 | 0.32 | 0.41 | 0.45 | 0.013 | 0.010 | — | 3.15 | 1.52 | — | — | — | — | 0.035 | 30 | — |
| tive Steel | 7 | 0.45 | 0.35 | 0.32 | 0.021 | 0.010 | 0.50 | 5.12 | 1.03 | — | 0.50 | — | — | 0.028 | 31 | — |
| Steel of | 8 | 0.29 | 0.25 | 0.41 | 0.009 | 0.005 | 0.60 | 4.01 | 2.02 | — | 0.15 | — | — | 0.012 | 21 | — |
| the | 9 | 0.34 | 0.21 | 1.17 | 0.007 | 0.004 | 0.48 | 3.10 | 1.61 | 0.80 | 0.10 | 0.10 | — | 0.010 | 18 | — |
| present | 10 | 0.36 | 0.05 | 0.35 | 0.008 | 0.003 | 0.71 | 3.50 | 2.10 | — | 0.13 | — | — | 0.014 | 15 | — |
| Inven- | 11 | 0.38 | 0.15 | 0.42 | 0.008 | 0.004 | 0.55 | 4.20 | 1.50 | 1.20 | 0.08 | 0.04 | 0.92 | 0.015 | 18 | — |
| tion | 12 | 0.30 | 0.11 | 0.43 | 0.008 | 0.004 | 0.70 | 3.82 | 2.10 | — | 0.15 | — | — | 0.015 | 22 | — |
| | 13 | 0.28 | 0.22 | 0.44 | 0.005 | 0.002 | 0.62 | 4.32 | 2.02 | — | 0.18 | — | — | 0.014 | 13 | — |
| | 14 | 0.32 | 0.07 | 0.42 | 0.005 | 0.002 | 0.60 | 3.78 | 1.37 | 1.12 | 0.16 | — | 0.28 | 0.013 | 15 | — |
| | 15 | 0.33 | 0.18 | 0.52 | 0.012 | 0.007 | 0.52 | 3.70 | 1.97 | — | 0.10 | — | — | 0.021 | 27 | — |

| Group | Steel Specimen No. | Nonmetallic Inclusions | | Refining Process |
|---|---|---|---|---|
| | | dA120 × 400 | d(B + C) 60 × 400 | |
| Conven- | 1 | 0.008 | 0.013 | High frequency |
| tional | 2 | 0.017 | 0.013 | furnace melting |
| Steel | 3 | 0.008 | 0.013 | Electric furnace |
| | 4 | 0.013 | 0.017 | melting (in air) |
| | 5 | 0.008 | 0.021 | |
| Compara- | 6 | 0.013 | 0.013 | High frequency |
| tive Steel | 7 | 0.013 | 0.017 | furnace melting |
| Steel of | 8 | 0.004 | 0.008 | Vacuum induction |
| the | 9 | 0 | 0.004 | melting |
| present | 10 | 0 | 0.004 | Vacuum degassing |
| Inven- | 11 | 0.004 | 0.004 | Electroslag |
| tion | 12 | 0 | 0.008 | remelting |
| | 13 | 0 | 0.004 | Electroslag |
| | 14 | 0 | 0.004 | remelting after vacuum degassing |
| | 15 | 0.008 | 0.013 | Electric furnace melting (in air) |

Each of the steel ingots was formed into a test piece having a thickness of 1 mm by hot rolling and cold rolling, the test piece being then subjected to a reliability test and an actual machine test using a finished product of a metal band saw.

Hardness that after heat treatment and tensile fatigue tests were carried out as the reliability test. The heat treatment hardness was measured after heat treatment

TABLE 2

| Group | specimen No. | Treatment (HV) | Tensile Fatigue Life 30 kgf/mm$^2$–100 kgf/mm$^2$ Hardness after Heat (number of times) |
|---|---|---|---|
| Conven- | 1 | 498 | 2.98 × 10$^4$ |
| tional | 2 | 512 | 3.12 × 10$^4$ |
| Steel | 3 | 512 | 4.42 × 10$^4$ |
| | 4 | 525 | 4.25 × 10$^4$ |

TABLE 2-continued

| Group | Steel specimen No. | Hardness after Heat Treatment (HV) | 30 kgf/mm$^2$–100 kgf/mm$^2$ Tensile Fatigue Life (number of times) |
| --- | --- | --- | --- |
| | 5 | 516 | 4.03 × 10$^4$ |
| Comparative | 6 | 507 | 3.05 × 10$^4$ |
| Steel | 7 | 518 | 3.67 × 10$^4$ |
| Steel of | 8 | 525 | 8.31 × 10$^4$ |
| the | 9 | 532 | 7.81 × 10$^4$ |
| Present | 10 | 545 | 9.55 × 10$^4$ |
| Inven- | 11 | 530 | 7.35 × 10$^4$ |
| tion | 12 | 525 | 8.11 × 10$^4$ |
| | 13 | 528 | 10.12 × 10$^4$ |
| | 14 | 531 | 10.04 × 10$^4$ |
| | 15 | 530 | 6.75 × 10$^4$ |

The results of the tensile fatigue tests shows that the conventional steel and comparative steel have a life within the range of 2×10$^4$ to 5×10$^4$, while the steel of the present invention has a life of 6×10$^4$ or more.

Although Specimen No. 15, which is the steel of the present invention, exhibits an excellent tensile fatigue life, as compared with the conventional steel and the comparative steel, it contains impurities and non-metallic inclusions in amounts greater that those in the other steel specimens of the present invention and has a tensile fatigue life slightly shorter than those of the other specimens. This reveals that the impurities and non-metallic inclusions contained in the steel of the present invention have a significant influence.

In particular, among the steel specimens of the present invention, Specimen Nos. 13 and 14, which were subjected to electroslag remelting, contain extremely small quantities of impurities such as phosphorous (P), sulfur (S), nitrogen (N) and oxygen (O) and exhibit particularly excellent fatigue life.

TABLE 3

| Group | Steel Specimen No. | Racing Test Life (Hr) |
| --- | --- | --- |
| Conventional | 1 | 32.5 |
| Steel | 4 | 42.8 |
| | 5 | 50.2 |
| Comparative Steel | 6 | 42.5 |
| Steel of the | 8 | 63.0 |
| Present | 9 | 64.5 |
| Invention | 11 | 63.2 |
| | 13 | 72.5 |
| | 15 | 59.7 |

Figures 2A, 2B:
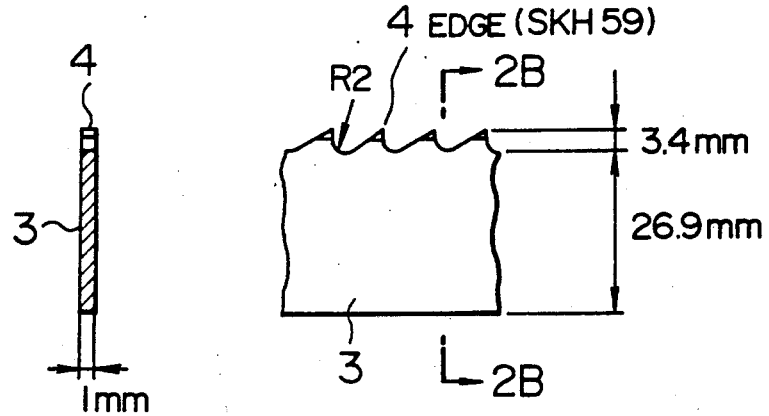
FIG. 2A is a drawing of the metal band saw produced for testing a steel specimen in an actual machine.
FIG. 2B is a sectional view taken at line 2B—2B in FIG. 2A.

As shown in Table 3, three specimens, one specimen and five specimens were selected from the conventional steel specimens, the comparative steel specimens and the steel specimens of the present invention, respectively. A metal band saw was formed by using as a backing material 3 each of the specimens selected and as an edge material 4 JIS G4403 SKH59 and subjected to an actual machine test (see FIGS. 2A and 2B).

The test was carried out at a saw edge speed of 80 m/min under racing in a state wherein tension of 2000 kg was loaded, and the time until each metal saw was fractured was measured.

The results of the tests are shown in Table 3.

Specimen No. 8 of the present invention shows a life 20 Hr longer than that of Specimen No. 6 of the comparative steel. This difference is caused by the difference between the materials, as well as the difference between the melting process used. In particular, Specimen No. 13 of the present invention having an appropriate chemical composition was formed by using a melting method which enables impurities such as phosphorous (P), sulfur (S), nitrogen (N) and oxygen (O) to be significantly reduced and exhibits a long life of 2 times those of the conventional steel specimens.

As is apparent from the above, the metal band saw backing materials of the present invention can maintain high fatigue strength even if they are subjected to heat treatment under the same conditions as those for high speed steel used as an edge material. The metal band saw backing materials of the present invention therefore exhibit particularly excellent performance as metal band saw backing materials in which the fatigue load is gradually increased owing to an increase in the number of kinds of hard-to-cut materials and severe cutting condition in advanced metal band saw mechanism.

What is claimed is:

1. A high fatigue strength metal band saw backing material comprising 0.27 to 0.40% of carbon, not more than 0.35% of Si, 0.3 to 1.2% of Mn, 0.45 to 0.75% of Ni, more than 3.0% to 4.5% of Cr, more than 1.5 to 2.3% of one or two of Mo and W in terms of "Mo +W/2", 0.03 to 0.2% of one or two of V and Nb in terms of "V+Nb/2", in terms of percent by weight, the balance Fe and inevitable impurities.

2. A high fatigue strength metal band saw backing material comprising 0.27 to 0.40% of carbon, not more than 0.35% of Si, 0.3 to 1.2% of Mn, 0.45 to 0.75% of Ni, more than 3.0% to 4.5% of Cr, 1.5 to 2.3% of one or two of Mo and W in terms of "Mo +W/2", 0.03 to 0.2% of one or two of V and Nb in terms of "V +Nb/2", 0.2 to 3% of Co, in terms of percent by weight, the balance Fe and inevitable impurities.

3. A high fatigue strength metal band saw backing material according to claim 1 or claim 2, wherein the amount of Si is not more than 0.08% by weight.

4. A high fatigue strength metal band saw backing material according to claim 1 or claim 2, wherein the amounts of phosphorous (P), sulfur (S), nitrogen (N) and oxygen (O) are not more than 0.012% by weight, not more than 0.004% by weight, less than 0.02% by weight and less than 30 ppm, respectively.

5. A high fatigue strength metal band saw backing material according to claims 1 or claim 2, wherein the amounts of phosphorous (P), sulfur (S), nitrogen (N) and oxygen (O) are not more than 0.012% by weight, not more than 0.004% by weight, less than 0.02% by weight and less than 30 ppm, respectively, and the amount of measured inclusions is not more than 0.004 in terms of dA120×400 and not more than 0.008 in terms of d(B+C) 60×400.

6. A high fatigue strength metal band saw backing material according to claim 1 or claim 2 wherein the material is produced from the steel ingot formed by refining using one or more refining processes selected from the group consisting of a vacuum melting process, a vacuum degassing process and an electroslag remelting process.

* * * * *